(12) United States Patent
Zhang et al.

(10) Patent No.: US 9,826,609 B1
(45) Date of Patent: Nov. 21, 2017

(54) STROBOSCOPIC LAMP APPARATUSES

(71) Applicant: QuanZhou Sambo Electronics Co., LTD., QuanZhou (CN)

(72) Inventors: Zhibao Zhang, QuanZhou (CN); ZhiZhi Zhang, QuanZhou (CN)

( * ) Notice: Subject to any disclaimer, the term of this patent is extended or adjusted under 35 U.S.C. 154(b) by 0 days.

(21) Appl. No.: 15/636,618

(22) Filed: Jun. 28, 2017

(30) Foreign Application Priority Data

Apr. 6, 2017 (CN) .................. 2017 2 03543988 U

(51) Int. Cl.
*H05B 33/08* (2006.01)
*H05B 37/02* (2006.01)
*H05B 41/34* (2006.01)
*F21S 10/06* (2006.01)
*F21K 9/00* (2016.01)
*H04W 52/00* (2009.01)

(52) U.S. Cl.
CPC .............. *H05B 41/34* (2013.01); *F21S 10/06* (2013.01); *H05B 37/02* (2013.01); *F21K 9/00* (2013.01); *H04W 52/00* (2013.01)

(58) Field of Classification Search
None
See application file for complete search history.

(56) References Cited

U.S. PATENT DOCUMENTS 7,084,531 B2 * 8/2006 Bruwer .................... H01H 9/54
307/112
2010/0164409 A1 * 7/2010 Lo ...................... H05B 33/0803
315/312

* cited by examiner

*Primary Examiner* — Dedei K Hammond
(74) *Attorney, Agent, or Firm* — The Law Office of Austin Bonderer, PC; Austin Bonderer

(57) ABSTRACT

The present invention discloses a stroboscopic lamp apparatus comprising a main control module and a number of LED modules. The main control module comprises a main CPU and a battery module supplying power to the stroboscopic lamp apparatus. The output terminal of the main CPU connects to two power bus lines. Each of the LED modules consists of a slave module and a number of LED wafers. The slave module comprises a slave CPU. The slave CPU comprises two bus connection pins, a number of address pins, and a number of output pins. The two bus connection pins are connected to the two power bus lines respectively. Different voltages are applied to the the address pins in order to configure different communication addresses. The output pins are connected to the plurality of the LED wafers.

4 Claims, 4 Drawing Sheets

STROBOSCOPIC LAMP APPARATUSES

BACKGROUND

1. Technical Field

The present invention generally relates to an electronic control technology, and more particularly to a stroboscopic lamp apparatus.

2. Discussion of Related Art

With the development of electronic technology, more and more wearable equipment are installed with a stroboscopic lamp apparatus for the purpose of identification. In the existing stroboscopic lamp apparatus, a LED module attached to the external control circuit is used to realize the control of the LED module, in this way, strobe effects can be achieved. Therefore, in the present technology, the LED module is an independent module which has a power supply module. Control signals need to be provided to the LED module by a control circuit in order to control each LED lamp beads of the LED module. In the present technology, in addition to connecting power cords, the LED module also need to connect lots of external control line. That will result in a lot of wiring and wired connections, and the design costs and materials costs will be increased. Besides, the probability of a short circuit occurring in the LED module will be increased because of the numerous wiring connections.

SUMMARY OF THE INVENTION

An object of the present invention is to provide a stroboscopic lamp apparatus, which is able to achieve the strobe control of LED module by connecting two power bus lines to the LED module.

In some embodiments this can be achieved by a stroboscopic lamp apparatus comprising a main control module and a plurality of LED modules. The main control module comprises a main CPU and a battery module. The battery module supplies power to the stroboscopic lamp apparatus. The output terminal of the main CPU connects to two power bus lines. Each one of the LED modules comprises a slave module and a plurality of LED wafers. The slave module comprises a slave CPU. The slave CPU comprises two bus connection pins, a plurality of address pins and a plurality of output pins. The two bus connection pins are connected to the two power bus lines respectively. Different voltages are applied to the plurality of the address pins in order to configure different communication addresses. The plurality of the output pins is connected to the plurality of the LED wafers.

Furthermore, each one of the plurality of the output pins of the slave CPU is connected to each one of the plurality of the LED wafers, and then connected to a COM pin of the slave CPU. Different voltages are applied to the plurality of the address pins by voltage output terminal of the slave CPU in order to configure different communication addresses.

Furthermore, the main control module further comprises a key and a wireless communication module. The main CPU is electrically connected to the key and the wireless communication module, respectively.

Furthermore, the wireless communication module can be a Bluetooth module, a Zigbee module, or a WiFi module.

In some embodiments, the above technical solution comprises benefits of:

The stroboscopic lamp apparatus comprises the main module and the plurality of LED modules are connected in parallel to the two power bus lines. The main control module can provide power access and control signal input to the plurality of LED modules by the two power bus lines. The main control module can also send out a plurality of address and control commands to achieve the strobe control of the LED modules. Thus, the stroboscopic lamp apparatus can achieve the strobe control through original power cord without extra control line.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "a" embodiment in this disclosure are not necessarily to the same embodiment, and such references mean "at least one."

Figure 1:
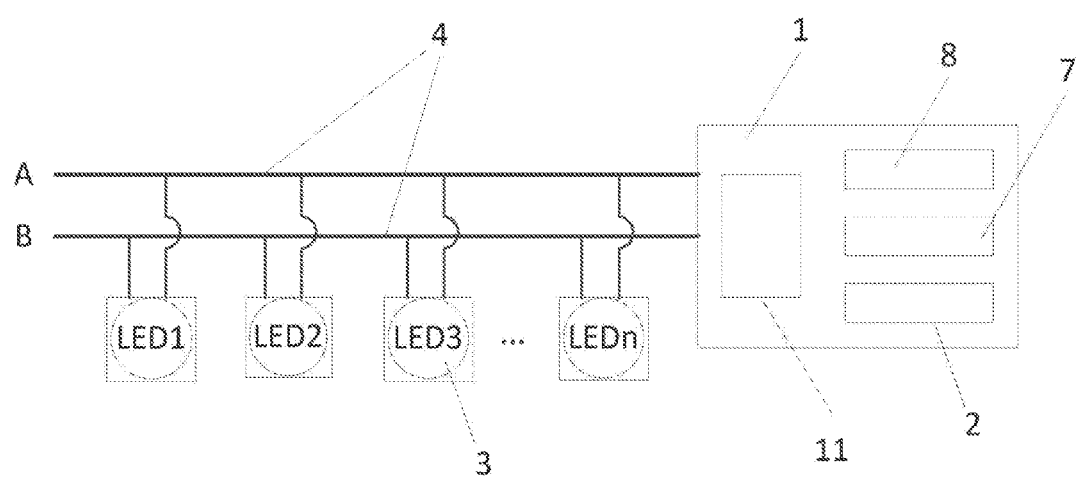
FIG. 1 is a schematic view of a stroboscopic lamp apparatus according to an embodiment of the present disclosure.
Figure 2:
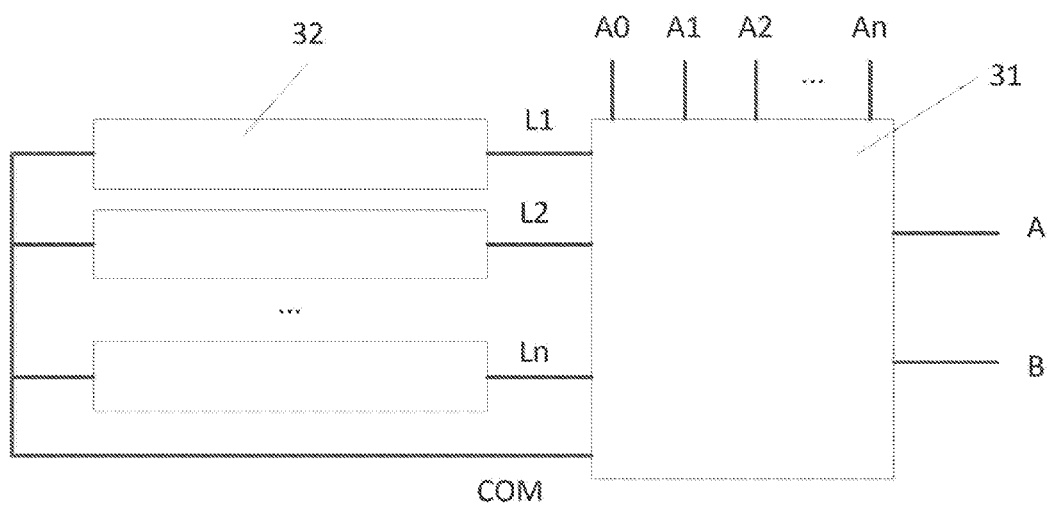
FIG. 2 is a schematic view of LED modules according to an embodiment of the present disclosure.

Referring to FIGS. 1 and 2, a stroboscopic lamp apparatus of one embodiment of the present disclosure comprises a main control module 1 and a plurality of LED modules 3, labeled as LED 1, LED 2, LED 3 . . . LED n. The main control module 1 comprises a main CPU 11, a battery module 2, a key 7, and a wireless communication module 8. The battery module 2 supplies power to entire apparatus. The main CPU 11 is electrically coupled to the key 7 and the wireless communication module 8. The main CPU 11 comprises output terminal connecting to two power bus lines 4. Each one of the LED modules 3 comprises a slave module and a plurality of LED wafers. In some embodiment, Each one of the LED modules 3 consists of a slave module and a plurality of LED wafers. The slave module comprises a slave CPU 31. The slave CPU 31 comprises two bus connection pins, a plurality of address pins and a plurality of output pins. The two bus connection pins respectively connect to the two power bus lines 4. Different voltages are applied to the plurality of the address pins in order to configure different communication addresses. The plurality of the output pins is connected to the plurality of the LED wafers 32.

In one embodiment, each one of the plurality of the output pins of the slave CPU, labeled as L0, L1, L2, . . . , Ln respectively, is connected to each one of the plurality of the LED wafers, and then connected to a COM pin of the slave CPU. Different voltages are applied to the plurality of the address pins, labeled as A0, A1, A2, . . . , An respectively, by voltage output terminal of the slave CPU in order to configure different communication addresses.

The wireless communication module can be a Bluetooth module, a Zigbee module, or a WiFi module, etc.

The working principle of the stroboscopic lamp apparatus is illustrated below:

Addresses of each one of the plurality of LED modules, with built-in control IC, are well configured during the production process of the apparatus. For example, different voltages are applied to the plurality of the address pins of the slave CPU, labeled as A0, A1, A2, . . . , An respectively, by voltage output terminal of the slave CPU in order to configure different communication addresses. After power on, all of the plurality of LED modules, with the built-in control IC, are powered by the two power bus lines. The key or wireless host sending the command to the main CPU, the main CPU receives the command and then sending different display commands to the plurality of LED modules having different addresses by the two power bus lines 4. The slave CPU in each one of the plurality of LED receives a matching command to display the corresponding status.

For example, the main CPU sends the addresses A0, A1, A2, . . . , An of the LED 1 and the corresponding control commands, the LED 1 executes the corresponding status display, while the other LEDs do not respond to the commands. The main CPU sends a plurality of addresses and control commands to different LEDs individually, to make them display different states.

Figure 3:
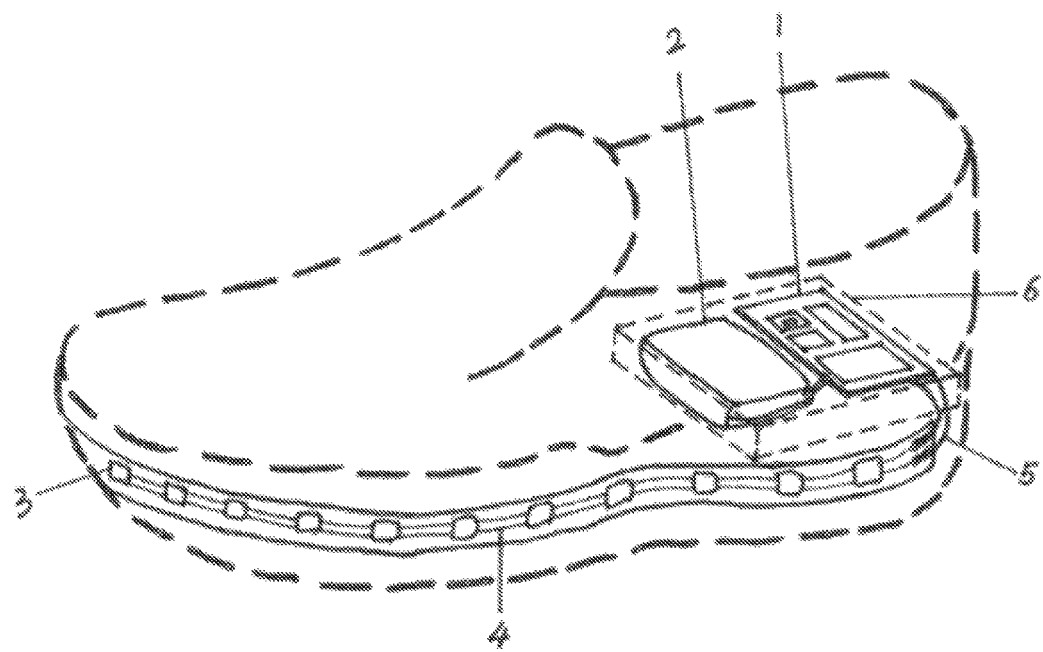
FIG. 3 is a schematic view of an application scenario of a stroboscopic lamp apparatus according to an embodiment of the present disclosure.
Figure 4:
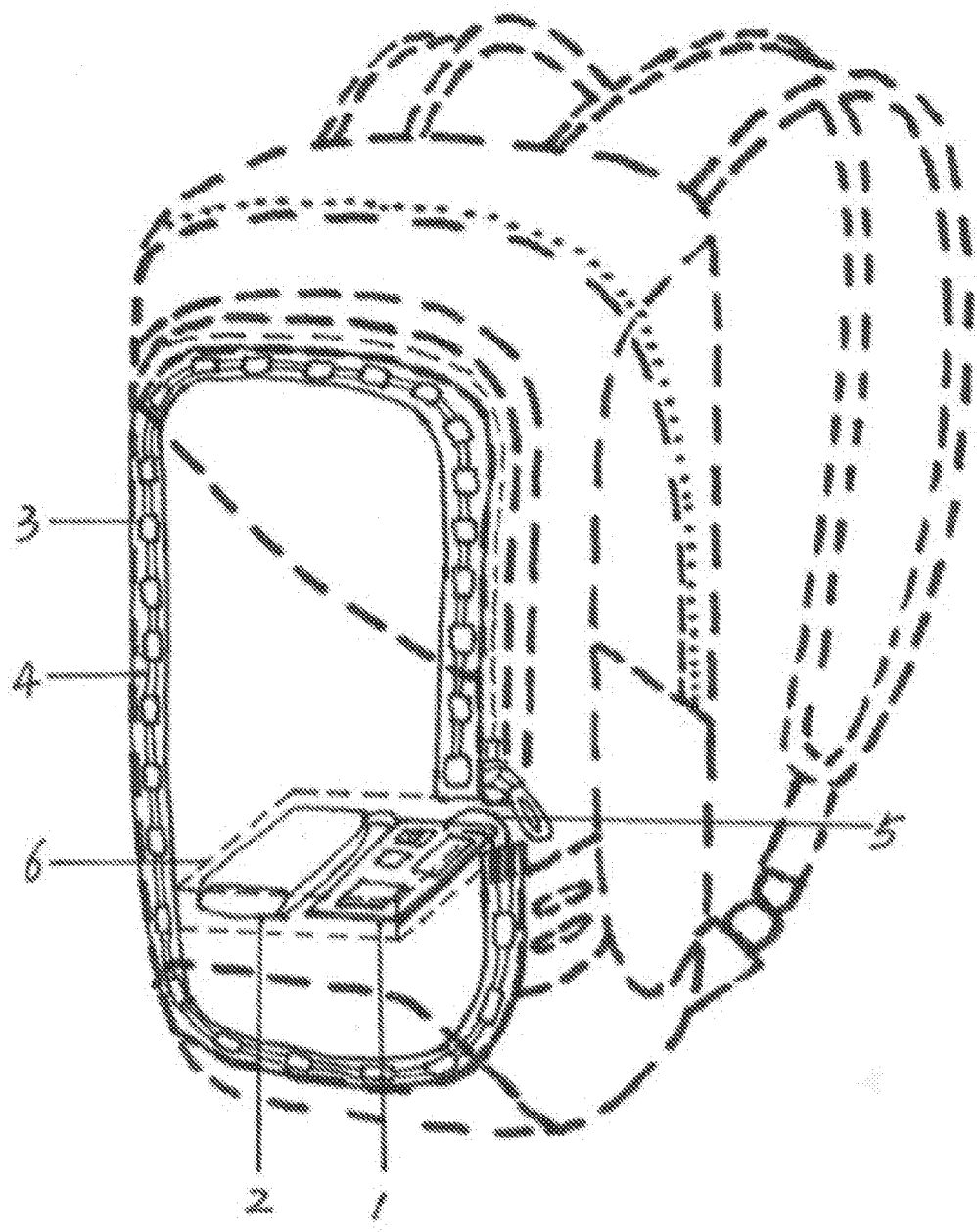
FIG. 4 is an another schematic view of an application scenario of a stroboscopic lamp apparatus according to an embodiment of the present disclosure.

Referring to FIGS. 3 and 4, in order to further illustrate the effectiveness of the present embodiment, application scenarios of the apparatus of the present embodiment will be further described in detail.

FIG. 3 shows the apparatus is applied to a shoe. The main control module 1 is located inside the shoe heel. The main control module 1 is powered by the battery module 2. The plurality of LED modules 3 is connected to the two power bus lines 4, which is connected to the output end of the main control module 1 via wire 5. The main control module 1 and the battery module 2 are enclosed in a main control box 6.

FIG. 4 shows the apparatus is applied to a backpack. The main control module 1 is located inside internal pocket of the front part of the backpack. The main control module 1 is powered by the battery module 2. The plurality of LED modules 3 is connected to the 2-wire bus 4, which is connected to the output end of the main control module 1 via the wire 5. The main control module 1, the battery module 2 are enclosed in a main control box 6.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A stroboscopic lamp apparatus comprising:
a main control module and a plurality of LED modules, wherein, the main control module comprises a main CPU and a battery module; the battery module is configured to supply power to the stroboscopic lamp apparatus; an output terminal of the main CPU connects to two power bus lines; each of the LED modules comprises a slave module and a plurality of LED wafers; the slave module comprises a slave CPU, and the slave CPU comprises two bus connection pins, a plurality of address pins, and a plurality of output pins; the two bus connection pins are connected to the two power bus lines respectively; the plurality of the address pins is connected to different voltages in order to configure different communication addresses; and the plurality of the output pins are connected to the plurality of the LED wafers.

2. The stroboscopic lamp apparatus of claim 1, wherein, each one of the plurality of the output pins is connected to each one of the plurality of the LED wafers, and each one of the plurality of the LED wafers is connected to a COM pin of the slave CPU; the plurality of the address pins is connected to the different voltages by voltage output terminal of the slave CPU in order to configure different communication addresses.

3. The stroboscopic lamp apparatus of claim 1, wherein, the main control module further comprises a key and a wireless communication module; and the main CPU is electrically connected to the key and the wireless communication module.

4. The stroboscopic lamp apparatus of claim 3, wherein, the wireless communication module is selected from a group consisting of Bluetooth module, Zigbee module, and WiFi module.

* * * * *

UNITED STATES PATENT AND TRADEMARK OFFICE
CERTIFICATE OF CORRECTION

PATENT NO. : 9,826,609 B1  
APPLICATION NO. : 15/636618  
DATED : November 21, 2017  
INVENTOR(S) : Zhibao Zhang and ZhiZhi Zhang Page 1 of 1

It is certified that error appears in the above-identified patent and that said Letters Patent is hereby corrected as shown below:

On the Title Page

The Applicant should be changed from:
"Quanzhou Sambo Electronics Co., LTD."
To:
-- Quanzhou Sanbao Electronic Co., Ltd. --

Signed and Sealed this
Twenty-sixth Day of June, 2018

Andrei Iancu
*Director of the United States Patent and Trademark Office*